May 2, 1961 M. A. DONOHOE 2,982,028
CHECKING DEVICE FOR BEVEL GEAR BLANKS
Filed Oct. 9, 1957 2 Sheets-Sheet 1
FIG. I
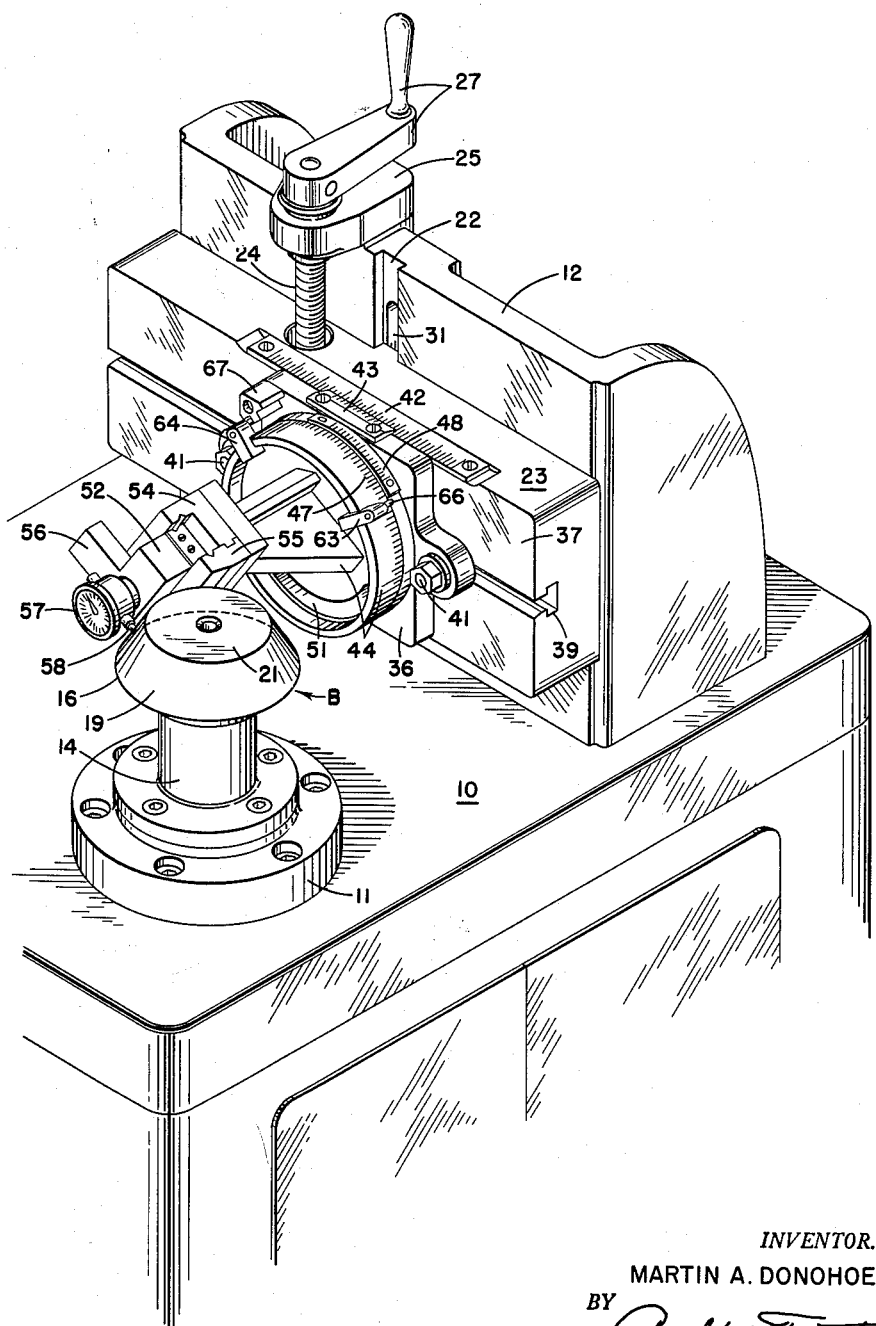
INVENTOR.
MARTIN A. DONOHOE
BY
ATTORNEY May 2, 1961  M. A. DONOHOE  2,982,028
CHECKING DEVICE FOR BEVEL GEAR BLANKS
Filed Oct. 9, 1957  2 Sheets-Sheet 2

United States Patent Office 2,982,028
Patented May 2, 1961

2,982,028

CHECKING DEVICE FOR BEVEL GEAR BLANKS

Martin A. Donohoe, Rochester, N.Y., assignor to The Gleason Works, Rochester, N.Y., a corporation of New York Filed Oct. 9, 1957, Ser. No. 689,115

4 Claims. (Cl. 33—179.5)

The present invention relates to a device for checking the dimens'ons of blanks for bevel gears, including hypoid gears, with respect to the location and angularity of their conical surfaces.

In the manufacture of bevel gears, including hypoid gears, checking the dimensions of the blank with respect to diameter of cylindrical surfaces and relative location of plane surfaces is readily accomplished by known gaging devices. However in the production of precision gears it is also important that the conical surfaces of the blanks be held within close tolerances as to location relative to the plane surfaces and also as to cone angle. In prevailing methods of gear design the theoretical plane of intersection of the face and back cones, or of the front and face cones, is located relative to a plane front or back face. However in manufacture of the blanks the edge, representing the circle of intersection of these cones with each other or with a plane surface, is removed by rounding or chamfering to avoid a sharp edge, making direct measurement to such circle impossible. The pr'mary objective of the present invention is a checking device by which the desired checking of the conical surfaces can be accomplished despite the absence of an actual circle of intersection.

A checking device according to the invention, for a bevel gear blank having a con'cal surface and an end face perpendicular to the axis of said surface, comprises a support for holding the blank with said axis and end face in predetermined relation thereto, a gage having a probe for contact with the blank, a head supporting the gage for rectilinear motion thereon to traverse the probe across the blank, a support for the head on wh'ch the latter is angularly adjustable about an axis perpendicular to the axis of the blank, the gage being so supported on the head that said rectilinear motion is in a direction perpendicular to said axis of angular adjustment and that the probe traverses a line which intersects the last-mentioned axis and which is disposed in a plane perpendicular to said last-mentioned axis and containing said axis of the blank, and means including a frame carrying said supports and providing for relative adjustment of them in a direction parallel to the axis of the blank and also in a direction perpendicular to both of said axes, whereby said axis of angular adjustment may be brought into tangency with the theoretical circle of intersection of said conical surface with another surface of the blank to enable said line traversed by the probe to intersect said circle.

The preferred embodiment of the invention is shown in the accompanying drawings, wherein:

Fig. 1 is an isometric view of the device with a gear blank mounted thereon;

Figure 4:
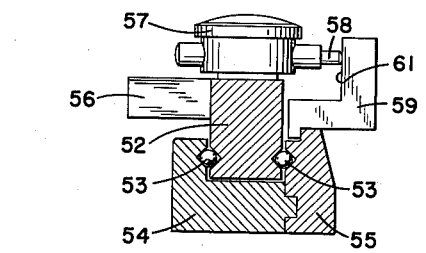

The illustrated device comprises a base 10 supporting in fixed relationship a chuck adapter 11 and a column 12. The adapter has a tapered bore 13 for receiving the tapered shank of a chuck 14 which in turn is adapted to support the bevel gear blank to be checked, in this case a hypoid pinoin blank B. This blank comprises a generally cylindrical shank 15 received in a bore in the chuck and a head 16 having a plane back face 17 seated on the upper end face of the chuck, a back cone 18, a face cone 19 and a plane front face 21.

Adjustable vertically on the plane front face of column 12, along guide way 22, is a vertical slide 23. For effecting such adjustment a screw 24 is journaled for rotation in, and held against axial motion by, a bearing block 25 affixed to the column, the screw being threaded to a sleeve secured to the slide by a screw 26. By turning the screw 24 by means of a crank 27 attached to the upper end thereof, the slide 23 may be adjusted up or down. After such adjustment it may be secured to the column by tightening a clamp handle 28 which is screw threaded to a stud 29, th's stud being anchored to the slide and extending through a slot 31 in the column. A clamp plate 32 is disposed between the clamp handle and the column and is supported by the stud 29 and another stud, 33, which is also anchored to the slide. Stud 33 is headed and is so proportioned as to hold the slide against the way 22, for adjustment therealong, when the clamp handle is loosened. The height to wh'ch the slide is adjusted is determined by gage blocks, not shown, which may be inserted between a lower gage seat 34 on the column 12 and an upper gage seat 35 on the bottom of the slide.

A cross-slide 36 is adjustable horizontally along the plane front face 37 of the vertical slide, for this purpose having a tongue 38 engaging the side walls of a horizontal T-slot 39 in the vertical slide. This adjustment is made after first loosening clamp nuts threaded to T-bolts 41 slidably anchored in the slot 39. The magnitude of such adjustment is shown by a scale 42 and vernier 43 which are mounted respectively on the vertical slide and cross-sl.de.

An angle adjusting member 44 has a trunnion 45 journaled for rotation in the cross-slide, to provide for adjustment of the member about horizontal axis 46. Such angular adjustment may be made with the aid of an angular scale 47 and vernier 48 after first loosening a headed clamp screw 49 whose shank extends through an arcuate slot 51 in the angle adjusting member and is screw threaded into one of a plurality of screw holes provided in the cross-slide 36 around the axis 46.

A gage carriage 52 is supported for rectilinear motion relative to member 44 by ball bearings 53 arranged in straight V-grooved bearing raceways 54 and 55 which are secured to the angle adjusting member. Such rectilinear motion is in a plane parallel to the front faces of the vertical slide and the cross-slide, and for effecting it the carriage is provided with a handle 56. Mounted on the carriage is a dial indicator 57 whose probe 58 is so positioned as to always contact the gear blank B in a plane containing the axis of the blank and parallel to the front faces of the column 12 and the vertical sl.de, and so that the tip of the probe, which contacts the blank, may touch the axis 46. A gage block 59 is arranged to seat on the raceway 55, in the manner shown in Fig. 4, and is so proportioned that when thus seated the plane of its front face 61 contains the axis 46.

To set up the machine for operation, the gage block is positioned as shown on the raceway and the indicator 57 with its probe in contact with face 61 is then adjusted to read zero. The gage block is then removed. For checking the type of gear blank illustrated, the vertical slide is adjusted to position the axis 46 in the intended or design plane of juncture of back cone 18 with face cone 19, the exact position being determinable by placing gage blocks of the proper height between seats 34 and 35 inasmuch as the vertical distance between seat 35 and axis 46 is a known value, as are also the vertical distance between seat 34 and upper surface 62 of the adapter and the height of the chuck 14 between surface 62 and back face 17 of the blank. In some instances it may be desirable to provide a vernier and scale, similar to 42, 43, on the column 12 and vertical slide 23, for use in adjusting the vertical slide instead of employing the seats 34, 35 and gage blocks for this purpose.

Figure 3:
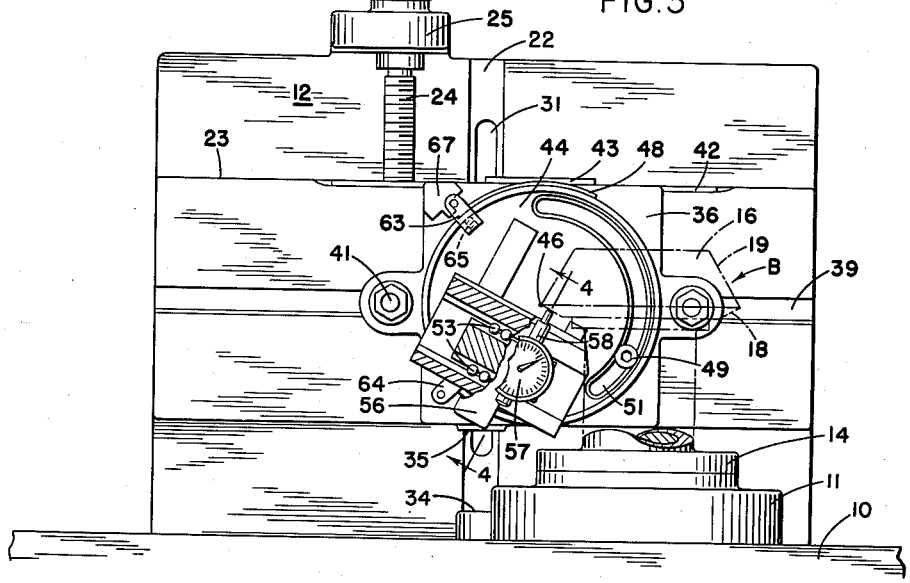
Fig. 3 is a front elevation, also with parts broken away and appearing in section; and, Fig. 4 is a detail section taken in the plane 4—4 of Fig. 3, and showing a calibrating gage associated with the measuring indicator of the device.

The cross-sl de is adjusted with the aid of the scale and vernier 42, 43 to position the axis 46 at a distance from the axis of the blank equal to the intended or design radius of the theoretical circle of intersection of face and back cones 19, 18. In this way the axis 46 is made tangent to this c rcle of intersection. The angular adjustment member is adjusted with the aid of scale and vernier 47, 48 to the design back cone angle of the blank, i.e. to the position shown in Fig. 3.

Figure 2:
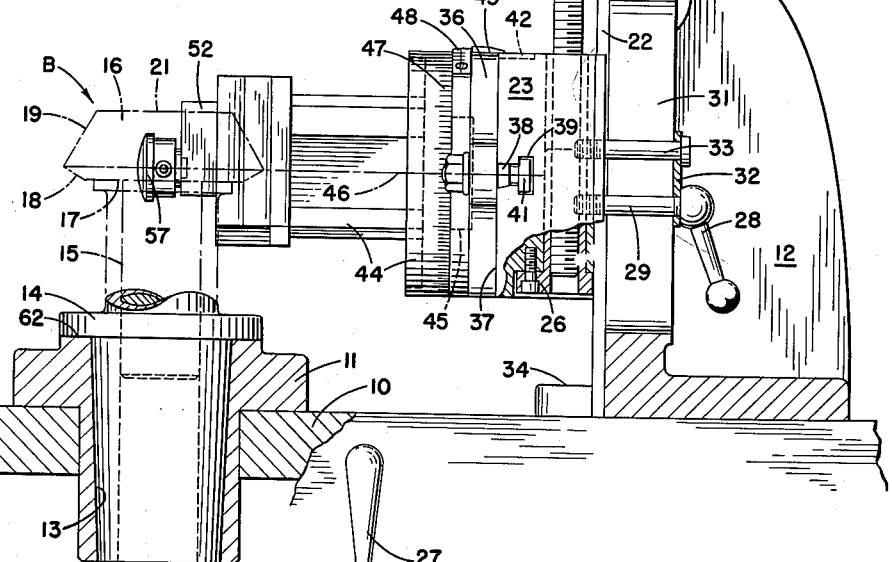
Fig. 2 is a fragmentary side elevation with parts broken away and appearing in section.

The gear blank B to be checked is now inserted in the chuck 14. The carriage 52 is moved back and forth to tram the ind cator 57, 58 across the back cone 18 and any deviations from zero are read. From such readings any deviation from the design value of either cone angle or of cone position relative to the back face 17 may be readily determined by trigonometric computation. The member 44 is then adjusted to the des gn face cone angle of the blank, i.e. to the position shown in Fig. 1, and the carriage 52 is operated to tram the indicator across the front cone 19 of the blank, any deviations from zero again being read, and, if desired, employed to determ ne the actual cone angle and position. While the member 44 is being adjusted from the position shown in Fig. 3 to the position shown in Fig. 1, it will move through the intermediate position shown in Fig. 2, wherein the raceways 54 and 55 are vertical. The device of course is not used with member 44 in this pos tion unless the workpiece has a cylindrical surface which is to be trammed by the indicator.

It will be understood that the checking procedure described above is set forth merely by way of an example applicable to the particular gear blank B shown in the drawings. With other types of gears, or on the basis of other design information, somewhat different procedures may be employed. For example in gear blanks having a front cone to be checked the axis 46 may be adjusted into tangency with the theoretical circle of intersect on of such front cone with the face cone. In other cases, where the design information includes the location of the theoretical circle of intersection of a conical surface with a plane surface of the blank, the ax s 46 may be adjusted into tangency with such circle preliminary to tramming the conical surface. In such case the plane surface may of course also be trammed if desired.

When a number of like blanks are to be checked, adjustable stops 63 and 64 are used. Each of these stops is in the general form of a C-clamp, and is secured to the forwardly extending peripheral flange of member 44 by a set screw 65, Fig. 3. Each has a rearwardly projecting pin 66, Fig. 1, adapted for abutment with a stationary stop 67 on cross-sl de 36. After first loosening the set screws the stop 63 is adjusted to abut stop 67 when member 44 is adjusted to the back cone angle, and stop 64 is adjusted to abut the stationary stop when the member is adjusted to the face cone angle.

When quantities of gear blanks of different design are to be tested, requiring frequent changes in the adjustment of the device, it may be preferred to employ master gear blanks in adjusting the slides 23 and 36 and the member 44, rather than us ng for this purpose the gaging means 34, 35, 42, 43, 47, 48.

Having now described the preferred form of my blank checking device, and the way it is used, what I claim as my invention is:

1. A checking device for a bevel gear blank having a conical surface and an end face perpendicular to the axis of said surface, compris ng a support for holding the blank with said axis and end face in predetermined relation thereto, a gage having a probe for contact with the blank, a head supporting the gage for rectilinear motion thereon to traverse the probe across the blank, a support for the head on which the latter is angularly adjustable about an axis perpendicular to the ax s of the blank, the gage being so supported on the head that said rectilinear motion is in a direction perpendicular to said axis of angular adjustment and that the probe traverses a line which intersects the last-mentioned ax s and which is disposed in a plane perpendicular to said last-mentioned axis and containing said axis of the blank, and means including a frame carrying sa d supports and providing for relative adjustment of them in a direction parallel to the axis of the blank and also in a direction perpendicular to both of said axes, whereby said axis of angular adjustment may be brought into tangency with the theoretical circle of intersection of said conical surface with another surface of the blank to enable said line traversed by the probe to intersect said circle.

2. A device according to claim 1 in which there is a gage block for seating on a reference surface on said head, said block having a surface which is engageable by said probe and which when the block is so seated contains said axis of angular adjustment.

3. A device accord ng to claim 1 in which the means for effecting relative adjustment comprise a first slide adjustable rectilinearly relative to the frame in a direction parallel to the axis of the blank, and a second slide adjustable rectilinearly relative to the frame in a direction perpendicular to both aforementioned axes.

4. A device according to claim 3 in which the support for the blank is mounted on the frame, the first slide is carried by the frame, the second slide is carr ed by the first slide, and said head is carried by the second slide.

References Cited in the file of this patent

UNITED STATES PATENTS

| | | |
|---|---|---|
| 1,832,953 | Watling | Nov. 24, 1931 |
| 1,886,543 | Hansen | Nov. 8, 1932 |
| 2,359,018 | Balk | Sept. 26, 1944 |
| 2,447,445 | Widen | Aug. 17, 1948 |
| 2,504,961 | Braaten | Apr. 25, 1950 |
| 2,723,461 | Reason | Nov. 15, 1955 |
| 2,770,048 | Ernst | Nov. 13, 1956 |

FOREIGN PATENTS

| | | |
|---|---|---|
| 418,780 | England | Oct. 31, 1934 |